United States Patent
Eigel

(10) Patent No.: US 9,630,618 B2
(45) Date of Patent: *Apr. 25, 2017

(54) EMERGENCY ASSISTANCE WITHOUT ACTIVATED LATERAL GUIDANCE ASSISTANCE

(71) Applicant: VOLKSWAGEN AKTIENGESELLSCHAFT, Wolfsburg (DE)

(72) Inventor: Thomas Eigel, Berlin (DE)

(73) Assignee: Volkswagen AG, Wolfsburg (DE)

( * ) Notice: Subject to any disclaimer, the term of this patent is extended or adjusted under 35 U.S.C. 154(b) by 0 days.

This patent is subject to a terminal disclaimer.

(21) Appl. No.: 14/895,550

(22) PCT Filed: May 9, 2014

(86) PCT No.: PCT/EP2014/059573
§ 371 (c)(1),
(2) Date: Dec. 3, 2015

(87) PCT Pub. No.: WO2014/195086
PCT Pub. Date: Dec. 11, 2014

(65) Prior Publication Data
US 2016/0121886 A1 May 5, 2016

(30) Foreign Application Priority Data
Jun. 4, 2013 (DE) .................. 10 2013 009 424

(51) Int. Cl.
*G01C 22/00* (2006.01)
*B60W 30/09* (2012.01)
(Continued)

(52) U.S. Cl.
CPC ............. *B60W 30/09* (2013.01); *B60K 28/06* (2013.01); *B60K 28/066* (2013.01); *B60W 10/18* (2013.01);
(Continued)

(58) Field of Classification Search
CPC ...... B60W 50/14; B60W 10/20; B60W 10/18; B60W 30/095; B60W 2050/143;
(Continued)

(56) References Cited

U.S. PATENT DOCUMENTS 5,585,785 A 12/1996 Gwin et al.
2005/0228588 A1* 10/2005 Braeuchle ........... B60W 30/095
701/301
(Continued)

FOREIGN PATENT DOCUMENTS

DE 102004024692 A1 12/2005
DE 102004027085 A1 12/2005
(Continued)

OTHER PUBLICATIONS

Waldmann et al.; The Emergency Stopping Assistant—Safe Stopping in the Event of Sudden Incapacity of a Vehicle Driver to Drive; 3rd German AAL Conference; Jan. 26-27, 2010; Berlin, Germany.
(Continued)

*Primary Examiner* — McDieunel Marc
(74) *Attorney, Agent, or Firm* — Barnes & Thornburg LLP

(57) ABSTRACT

A method and a device for transitioning a vehicle driving without activated lateral guidance assistance into a driving state having reduced risk of collision consequences in the event of an emergency of the driver, wherein the speed of the vehicle is greater than a threshold speed. The method includes detecting a hands-off situation of the driver in a hands-off phase and outputting a hands-off warning, per-
(Continued)

forming a warning escalation in an escalation phase if there is no response to the hands-off warning, and reducing the vehicle speed to a speed less than the threshold speed in an intervention phase if there is no response in the escalation phase. During the hands-off phase, the escalation phase, and the intervention phase, a returning torque is applied to the steering apparatus of the vehicle if it is detected that the vehicle is leaving the current lane.

10 Claims, 2 Drawing Sheets

(51) Int. Cl.
*B60W 50/14* (2012.01)
*B60K 28/06* (2006.01)
*B62D 15/02* (2006.01)
*B60W 30/12* (2006.01)
*B60W 30/14* (2006.01)
*B60W 10/18* (2012.01)
*B60W 10/20* (2006.01)
*B60W 30/095* (2012.01)

(52) U.S. Cl.
CPC .......... *B60W 10/20* (2013.01); *B60W 30/095* (2013.01); *B60W 30/12* (2013.01); *B60W 30/146* (2013.01); *B60W 50/14* (2013.01); *B62D 15/025* (2013.01); *B62D 15/0255* (2013.01); *B60W 2050/143* (2013.01); *B60W 2050/146* (2013.01); *B60W 2400/00* (2013.01); *B60W 2520/10* (2013.01); *B60W 2540/26* (2013.01); *B60W 2710/18* (2013.01); *B60W 2710/20* (2013.01); *B60W 2720/10* (2013.01); *B60W 2720/24* (2013.01)

(58) Field of Classification Search
CPC ....... B60W 2050/146; B60W 2400/00; B60W 2710/20; B60W 2710/18; B60W 2720/10; B60W 2720/24; B60W 50/12

USPC ....................................... 701/10, 23, 41, 301
See application file for complete search history.

(56) References Cited

U.S. PATENT DOCUMENTS

| | | | |
|---|---|---|---|
| 2015/0166062 A1* | 6/2015 | Johnson ................ | B60W 30/12 701/41 |
| 2016/0107644 A1* | 4/2016 | Eigel .................... | B60W 50/14 701/70 |
| 2016/0132054 A1* | 5/2016 | Eigel .................... | B60W 50/14 701/23 |

FOREIGN PATENT DOCUMENTS

| | | |
|---|---|---|
| DE | 102004041225 A1 | 3/2006 |
| DE | 102004047861 A1 | 4/2006 |
| DE | 102006056094 A1 | 5/2008 |
| DE | 102007043604 A1 | 3/2009 |
| DE | 102009022055 A1 | 11/2010 |
| DE | 102009041187 A1 | 2/2011 |
| DE | 10201116301 A1 | 4/2012 |
| DE | 112009004689 T5 | 10/2012 |
| DE | 102012207524 A1 | 11/2012 |
| DE | 102012207525 A1 | 11/2012 |
| DE | 102011109618 A1 | 2/2013 |
| EP | 2314490 A1 | 4/2011 |
| JP | 2003058993 A | 2/2003 |

OTHER PUBLICATIONS

Search Report for German Patent Application No. 10 2013 009 424.0; Oct. 21, 2013.
Search Report for International Patent Application No. PCT/EP2014/059573; Jul. 10, 2014.

* cited by examiner

EMERGENCY ASSISTANCE WITHOUT ACTIVATED LATERAL GUIDANCE ASSISTANCE

PRIORITY CLAIM

This patent application is a U.S. National Phase of International Patent Application No. PCT/EP2014/059573, filed 9 May 2014, which claims priority to German Patent Application No. 10 2013 009 424.0, filed 4 Jun. 2013, the disclosures of which are incorporated herein by reference in their entirety.

FIELD

Illustrative embodiments relate to a method for transferring a vehicle driving without activated lateral guidance assistance into a driving state with a reduced risk of consequences of a collision in the event of the driver experiencing an emergency, that is to say to emergency assistance, and to a corresponding emergency assistance system.

BACKGROUND

In the field of active safety of a motor vehicle, contemporary driver assistance systems are already able to perform driving tasks of the driver of a motor vehicle and to carry out partially automated driving functions. This is manifest in the examples of adaptive cruise control or lane assist or lane keeping assistant to lateral guidance assistance (lane assist or heading control).

However, these driving assistance systems have virtually no provision in their configuration for partial or total failure of the driver of the motor vehicle. Such failure of the driver to carry out the driving functions for which he is responsible can be caused, for example, by excessive fatigue or a suddenly occurring health problem of the driver. Excessive fatigue often brings about momentary nodding off and an associated brief loss of control of the vehicle. Health problems mean physical incapacity of the driver to drive the vehicle and can be, for example, a sudden heart attack. Such situations often lead to serious accidents, in particular if the vehicle is moving at a high speed on a freeway or a road similar to a freeway.

Illustrative embodiments provide a method and a device wherein a vehicle travelling at high speed without an activated lateral assistance is transferred into a driving state with a reduced risk of consequences of collision, without a complex sensor system, when it is assumed that the driver is experiencing an emergency.

BRIEF DESCRIPTION OF THE FIGURES

Disclosed embodiments will be explained below with reference to the drawings, in which.

DETAILED DESCRIPTION OF THE DISCLOSED EMBODIMENTS

Figure 1:
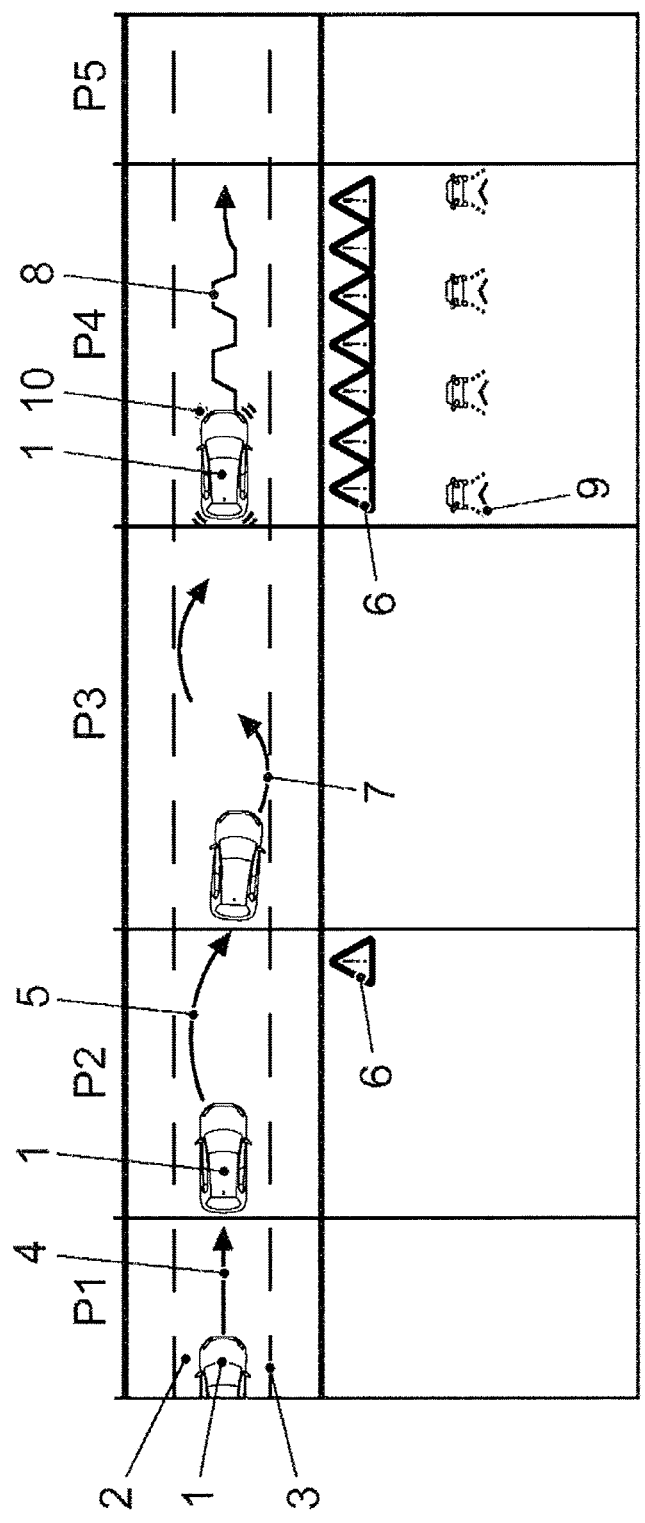
FIG. 1 shows a schematic functional description of the method.

The disclosed method for transferring a vehicle driving with non-activated lateral guidance assistance into a driving state with a reduced risk of consequences of collision, wherein the speed of the vehicle is higher than a predefined speed limit, has the following steps:

Detecting a hands-off situation of the driver in a hands-off phase and outputting a hands-off warning, Carrying out a warning escalation in an escalation phase if there is no reaction to the hands-off warning, and Reducing the speed of the vehicle in an intervention phase to a speed which is lower than the predefined speed limit if there is no reaction in the escalation phase, wherein during the hands-off phase, the escalation phase and the intervention phase, a returning torque is applied to the steering device of the vehicle if exiting of the vehicle from the current lane is detected.

The single and decisive triggering criterion which is adopted for the implementation of the emergency assistance is the detection of a hands-off situation, but this detection occurs for some time, for example for about 10 seconds at maximum. If the lateral guidance assistance is not activated during this phase, the vehicle has a high probability of exiting the lane in the event of failure of the driver during the hands-off phase. To prevent this even when the lateral guidance assistance is deactivated during the hands-off phase a torque which returns the vehicle to the lane is applied to the steering if it is detected that the vehicle is exiting the lane. As a result, the hands-off detection is provided with sufficient time to reliably detect a hands-off situation.

During the escalation phase, lateral guidance of the vehicle may take place in such a way that the vehicle is just prevented from leaving the current lane as a function of the speed of the vehicle. As a result, the vehicle oscillates to and fro between the marks on each of its current lane, which, on the one hand, is intended to provoke the driver, if he is capable of driving, or the possible front-seat passenger, to react and, on the other hand, is intended to inform and warn the surrounding traffic about a possible complication.

In the intervention phase, the warning escalation may be intensified in that at least the lateral guidance of the vehicle is adversely affected further by a jerky lateral profile, wherein the vehicle continues to be kept on the current lane. In this way, in the intervention phase intensified attempts are made to provoke a reaction of the driver or of a possible front-seat passenger. In addition, this unorthodox driving style clearly signals to the surroundings of the vehicle that something is not right with the vehicle; a clear warning is therefore given to the surroundings of the vehicle.

In the intervention phase, braking jolts may be used for escalating the warning. These braking jolts are intended to stimulate a reaction on the part of the driver or of the front-seat passenger. The braking jolts also have the additional effect here of warning the surroundings of the vehicle.

Finally, in the intervention phase the audible and/or visual warning can be intensified to cause the driver to react. In addition, in the intervention phase the flashing warning indicator system can be activated to generate a further direct warning to the surroundings of the vehicle.

When the speed limit or emergency speed, which is in particular 60 km/h, is reached, all the longitudinal and lateral guidance as well as all the warnings may be deactivated. Starting from this time, an accident of the vehicle must therefore be expected, the consequences of which would not appear to be life-threatening owing to the emergency speed which is low for a freeway or road which is similar to a freeway, in particular since in the case of an emergency of the driver the speed is decreased further and the vehicle will exit the roadway in a foreseeable time owing to a lack of steering activity.

It is also possible that the speed limit is formed by the speed zero, i.e. the vehicle is braked to the stationary state in the intervention phase and consequently will remain in its lane.

The disclosed device, which serves to carry out the method described above for transferring a vehicle driving with lateral guidance assistance into a driving state with a reduced risk of consequences of collision comprises a longitudinal guidance assistant, a lateral guidance assistant, a hands-off detection device, and an emergency assistant for carrying out warning escalations and interventions into the driving functions of the vehicle as a function of the results of the hands-off detection device, wherein the emergency assistant performs the lateral guidance of the vehicle at least during the hands-off detection when the lateral guidance is deactivated.

The emergency assistant may carry out the warning escalation in at least two successive phases, specifically, in particular an escalation phase and a subsequent intervention phase, after a positive hands-off detection, wherein in the escalation phase warnings to the driver or the front-seat passenger are generated to an increased degree, while in the intervention phase in addition to further escalation of the warnings, interventions are additionally made into the events on the road. These interventions can be braking interventions and lateral guidance interventions. In addition, interventions into the drive train are possible to slow down the vehicle.

After the intervention phase has run without success and when a speed limit is reached, the emergency assistant deactivates the longitudinal and lateral guidance and all the warnings.

FIG. 1 describes in a schematic illustration the mode of functioning of the method for transferring a vehicle 1 driving with non-activated lateral guidance assistance into a driving state with a reduced risk of consequences of collision in the event of the driver experiencing an emergency, which method is implemented in an emergency assistant and which reduces the speed of the vehicle 1 in a controlled fashion to an emergency speed.

In a first phase P1, a vehicle 1 moves on a lane 2, for example a freeway or a road which is similar to a freeway and which is delimited with respect to adjacent lanes with marks 3. The speed of the vehicle is higher in this phase than the abovementioned emergency speed or preceding speed limit. For example, the current vehicle speed in the case of a freeway can be approximately 150 km/h, wherein the emergency speed may be 60 km/h. In this phase P1, the driver is capable of driving and the vehicle 1 moves along a driving trajectory 4, wherein the vehicle 1 is kept centrally on its lane 2 by the driver. Longitudinal guidance, such as, for example, ACC, can be active or inactive here.

In the second phase P2, the hands-off phase, a hands-off device detects that the driver of the vehicle 1 is no longer holding the steering wheel. After the time period, which can usually be 10 seconds at maximum, a hands-off warning is issued by at least one audible warning, which is symbolized by the warning signal 6 in FIG. 1. Since when lateral guidance assistance is not present during the second phase P2 there is a very high risk of the vehicle 1 with the high speed specified as an example at the beginning leaving the lane 2 in the event of a driver being incapable of driving, and consequently there is a high risk of an accident, the emergency assistant carries out lateral guidance assistance in this second phase P2, and the vehicle is prevented from leaving the lane 2 along the driving trajectory 5 (illustrated by way of example in FIG. 1) of the second phase P2. The switching of the necessary returning steering torque can be carried out by the emergency assistant or by a suitable activation of the lateral guidance assistance by the emergency assistant. After the expiry of the second phase P2 and the outputting of the hands-off warning, no conclusions can be drawn as to whether the driver has intentionally or unintentionally ceased to have contact with the steering wheel.

If the driver of the vehicle 1 does not react to the hands-off warning indications 6 of the second phase P2, this can indicate that the driver is intentionally driving in a hands-free fashion to test the automatic driving possibilities of the lateral guidance. This needs to be prevented. The absence of steering interventions, detected by the hands-off detection, can, however, also mean that the driver of the vehicle 1 is not capable of driving. This can be caused by a medical emergency or by the driver falling asleep, for example, owing to excessive fatigue.

In the third phase P3, the escalation phase, the intention is therefore to make an attempt, independently of the reason for the lack of steering activity, to reactivate the driver or activate the front-seat passenger. For this purpose, when the third phase P3 is entered, a first step of the warning escalation is carried out, wherein the emergency assistant which is activated in the background of the escalation phase P3 causes lateral guidance assistance of the vehicle 1 to continue to be carried out, but the intervention of the lateral guidance takes place at a later time compared to the normal behavior of the lateral guidance. In this context, the intervention time is selected such that the vehicle 1 just fails to leave the lane 2 and, as it were, oscillates to and fro between the left-hand and right-hand marks 3 of the lane 2, along a driving trajectory 7 of the third phase P3. For the driver of the vehicle 1, who has, for example, briefly nodded off or wished to test the technology to its limits, the driving is made uncomfortable in this way. Furthermore, this is an indication that the driver must assume responsibility for driving again. If the driver continues to remain inactive, which makes incapacity to drive more probable, this is also an urgent indication to a possible front-seat passenger to now become active by, for example, taking over the steering or taking some other measure.

If the driver of the vehicle 1 continues to show no reaction, the method goes into the fourth phase P4, the intervention phase, in which, on the one hand, the warning escalation is intensified and, on the other hand, a reduction in the vehicle speed is brought about by a corresponding intervention into the control of the vehicle 1. In other words, the emergency assistant then acts in the foreground. The further warning escalation can be brought about by continuous audible warning, as is illustrated schematically in FIG. 1 by the multiplicity of warning symbols 6, and a flashing display symbol 9 may indicate that the emergency assistant is acting actively in the foreground. In addition, the vehicle 1 is placed in an unsteady state by brief braking jolts, to reduce the driving comfort further. To assist reactivation of the driver of the vehicle 1 or also to trigger a reaction by the front-seat passenger, the lateral guidance of the vehicle 1 continues to be made increasingly uncomfortable. This is caused by steering interventions which generate a jerky lateral profile, as is illustrated symbolically by the driving trajectory 8 of the fourth phase P4, wherein the vehicle 1 continues to be kept within the current lane 2. This unusual driving trajectory 8 additionally warns the surroundings of the vehicle 1. A further warning of the surroundings can also be issued, for example, by activating the flashing warning indicator system 10. In addition, tail-end collisions with a vehicle which is travelling ahead on the vehicle's own lane 2 can be avoided in this fourth phase P4 by means of an ACC system which is active or is acting passively in the background.

When the emergency speed, which may be 60 km/h, is reached, the fifth phase P5 of the method sequence is reached in which, on the proviso of a non-critical traffic situation, the longitudinal and lateral guidance as well as all the warnings are deactivated. In this context, a non-critical traffic situation means that the further road profile does not have any critical curvature and that no critical approach to a vehicle travelling ahead is detected. Although it appears at first sight that the vehicle is more or less left to itself in the fifth phase P5, the consequences of an accident of the vehicle at the specified emergency speed are manageable. In addition, a tail-end collision with the following vehicle is less serious, owing to the relative speed, than if the vehicle had been brought to a standstill.

Figure 2:
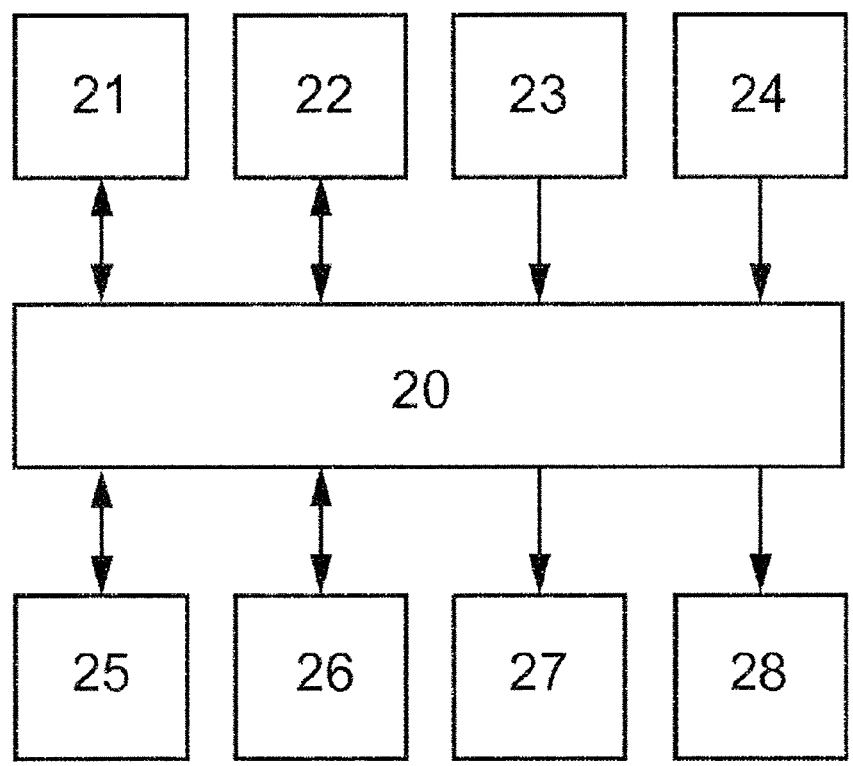
FIG. 2 shows a block diagram of the device for carrying out the method.

FIG. 2 shows a schematic illustration of the disclosed device whose core component is formed by an emergency assistant 20. The emergency assistant 20 is connected to a lateral guidance device 21 and a longitudinal guidance device 22. A lateral guidance device is, for example, a lane-keeping device or a lane assist. For example an adaptive cruise controller, that is to say an ACC, or an emergency braking assistant is considered as a longitudinal guidance device. In addition, the emergency assistant receives information from a hands-off detection 23 and a device 24 for detecting driver/front-seat passenger activity.

Owing to the result of the hands-off detection 23, the emergency assistant 20 generates suitable warnings 25 of an audible, visual and/or haptic nature and carries out steering interventions 26, braking interventions 27 and interventions into the drive train 28.

In the field of active safety of a motor vehicle, contemporary driver assistance systems are already able to perform driving tasks of the driver of a motor vehicle and to carry out partially automated driving functions. This is manifest in the examples of adaptive cruise control or lane assist or lane keeping assistant to lateral guidance assistance (lane assist or heading control).

However, these driving assistance systems have virtually no provision in their configuration for partial or total failure of the driver of the motor vehicle. Such failure of the driver to carry out the driving functions for which he is responsible can be caused, for example, by excessive fatigue or a suddenly occurring health problem of the driver. Excessive fatigue often brings about momentary nodding off and an associated brief loss of control of the vehicle. Health problems mean physical incapacity of the driver to drive the vehicle and can be, for example, a sudden heart attack. Such situations often lead to serious accidents, in particular if the vehicle is moving at a high speed on a freeway or a road similar to a freeway.

Document DE 10 2009 022 055 A1 describes a lane holding assistant which, when it is detected that a vehicle is exiting a lane, generates a counteracting steering torque to return the vehicle to the lane, wherein the generated counteracting steering torque can be deactivated or overridden by the driver. To prevent the lane being exited, if there is a risk of collision during a lane change or excessive fatigue of the driver has been detected, a threshold value which is necessary to override the generated counteracting steering torque can be increased and a warning in this regard can be output. The system can, however, not effectively counteract total or partial failure of the driver, since it would counteract this state with automatic travel.

Likewise, publication DE 10 2011 116 301 A1 describes a control device for carrying out assisting interventions into the longitudinal control and/or lateral control of a vehicle, wherein the control device changes over from a deactivated state into an activated state if a predefined degree of attentiveness of the driver is reached or undershot. In other words, the control device prevents the vehicle leaving the roadway, for example in the case of an excessively fatigued driver. However, the system would also go into an automatic driving mode here if the driver fails partially or totally.

Since the abovementioned situations which result in accidents also occur as a result of health problems, in particular heart problems and circulation problems, of relatively old people, the BMFT (German Ministry for Education and Research) started the SmartSenior project which has the purpose of developing technical measures for helping elderly people to continue to participate in everyday life. Within the scope of this project, an emergency stopping assistant was developed for ensuring a motor vehicle is stopped safely in the event of a sudden incapacity of the driver of the vehicle to drive.

The publication P. Waldmann et al.: "Der Nothalteassistent-abgesichertes Anhalten bei plötzlicher Fahrunfähigkeit des Fahrzeugführers [The emergency stopping assistant-safe stopping in the event of sudden incapacity of the vehicle driver to drive]", 3rd Deutscher AAL-Kongress [German AAL Conference], January 26-27, 2010, Berlin, transcript of conference, ISBN 978-3-8007-3209-8, VDE Verlag Berlin, describes such an emergency stopping assistant. In this context, the emergency stopping assistant for the detected case of physical incapacity of the driver of the vehicle avoids an accident and transfers the vehicle into a safe state. Should this not be possible owing to a complex traffic situation, at least the energy of the vehicle must be reduced as far as possible to reduce the consequences of the accident. Reliable detection of the physical incapacity of the driver requires a correspondingly complex sensor system with corresponding evaluation.

The emergency stopping assistant transfers the vehicle into a safe state, i.e. into the stationary state, wherein the emergency stopping assistant is designed here exclusively for use on freeways and main roads which are similar to freeways. In this case, the safe state of the vehicle is ensured in an ideal case by a stationary state on the breakdown lane, wherein to reach the breakdown lane the emergency stopping assistant has to perform a lane change, under certain circumstances.

The automated emergency stop on a breakdown lane requires not only reliable lane guidance and longitudinal guidance, brought about by means of the ACC and the lane assist, but also the possibility of a safe lane change. For this purpose, the emergency stopping assistant must be equipped with a complex surroundings-sensing sensor system to sense objects in the 360° surroundings of the vehicle and track them. In addition, a precise digital map is required to determine positions. However, if, for example, the traffic density is so high that a lane change proves to be too difficult, the vehicle is braked to the stationary state in the current lane.

Although the traffic behind should be taken into account when this emergency stop is made within the vehicle's own lane on a freeway or a main road which is similar to a freeway, at the speeds which are customary on a freeway, it is possible, owing to the high relative speed between the stationary vehicle and the following traffic, for tail-end collisions to occur with a high input of energy into the stationary vehicle, which can lead to serious consequences of the collision. In addition, in the known emergency stopping system a costly emergency detection sensor system and surroundings sensor system are necessary.

Document DE 10 2011 109 618 A1 describes a method and a device for operating a vehicle, wherein at least when incapacity of the driver of the vehicle to drive is detected, an intervention into a braking function, steering function and/or drive train function is activated automatically and the vehicle is braked to a standstill. In this context, incapacity of the driver to drive can be determined by means of steering, acceleration and/or brake activation patterns which occur, on the basis of detected fatigue of the driver, on the basis of a multiplicity of activated driver assistant interventions within a predefineable time period and/or detected exiting of the vehicle from the roadway. The vehicle here may also be brought to a standstill on a breakdown lane, which requires a costly emergency detection sensor system and surroundings-sensing sensor system as well as the possibility for controlled automatic lane change.

In known emergency stopping assistants, on the one hand the requirements made of the necessary complex sensor system are very stringent and, on the other hand, in the case of a stopping process to a stationary state of the vehicle outside a safe emergency lane or breakdown lane there is the risk of tail-end collisions with a high input of energy.

LIST OF REFERENCE SYMBOLS

P1 First phase
P2 Second phase
P3 Third phase
P4 Fourth phase
P5 Fifth phase
1 Vehicle
2 Lane
3 Marks
4 Driving trajectory first phase
5 Driving trajectory second phase
6 Audible/visual warning
7 Driving trajectory escalation phase emergency assistant
8 Driving trajectory intervention phase emergency assistant
9 Visual display emergency assistant
10 Flashing warning indicator
20 Emergency assistant
21 Lateral guidance device
22 Longitudinal guidance device
23 Hands-off detection
24 Detection of driver activity/front-seat passenger activity
25 Audible/visual/haptic warning
26 Steering intervention
27 Braking intervention
28 Drive train intervention

The invention claimed is:

1. A method for activating a vehicle driving state with reduced risk of consequences of collision in response to a driver of the vehicle experiencing an emergency while driving the vehicle with non-activated lateral guidance assistance, wherein the speed of the vehicle is higher than a speed limit, the method comprising:

detecting, via a hands-off device, a hands-off situation of the driver and outputting a hands-off warning in a hands-off phase;

carrying out a warning escalation in an escalation phase when there is no reaction detected in response to the hands-off warning; and reducing the speed of the vehicle in an intervention phase, via a longitudinal guidance device, to a speed which is lower than the speed limit if there is no reaction in the escalation phase, wherein, during the hands-off phase, the escalation phase and the intervention phase, lateral guidance is activated and applies a steering torque which returns the vehicle to the lane when exiting of the vehicle from the current lane is detected.

2. The method of claim 1, wherein, during the escalation phase, the emergency assist device carries out lateral guidance of the vehicle so that the vehicle is prevented from leaving the current lane as a function of the speed of the vehicle.

3. The method of claim 1, wherein, in the intervention phase, the warning escalation is intensified, and the lateral guidance which keeps the vehicle in the current lane is configured so that said lateral guidance has a jerky lateral profile.

4. The method of claim 3, wherein braking jolts are used for escalating the warning in the intervention phase.

5. The method of claim 3, wherein audible and/or visual warnings are intensified in the intervention phase.

6. The method of claim 3, wherein the flashing warning indicator system is activated in the intervention phase.

7. The method of claim 1, wherein, when the speed limit is reached, all the longitudinal and lateral guidance as well as all the warnings are deactivated.

8. An in-vehicle device for transferring the vehicle driving without activated lateral guidance assistance into a driving state with a reduced risk of consequences of collision in the event of the driver experiencing an emergency, the device comprising:

a longitudinal guidance assistant;
a lateral guidance assistant; and
a hands-off detection device,
wherein the device has an emergency assistant for carrying out warning escalations and interventions into the driving functions of the vehicle as a function of the results of the hands-off detection device and wherein the device is coupled to at least one of steering, braking, and drive train devices for performing lateral guidance of the vehicle when the lateral guidance assistance is deactivated.

9. The device of claim 8, wherein, after a positive hands-off detection, the emergency assistant carries out the warning escalation in at least two successive driving phases, including an escalation phase and a subsequent intervention phase.

10. The device of claim 8, wherein, after the intervention phase has run without success and when a speed limit is reached, the emergency assistant deactivates the longitudinal guidance assistant and the lateral guidance assistant as well as all the warnings.

* * * * *